United States Patent
Schuetze et al.

(10) Patent No.: US 9,492,787 B2
(45) Date of Patent: Nov. 15, 2016

(54) METHOD FOR PREVENTING THE CONTAMINATION BY PLATINUM OF AN SCR CATALYST

(71) Applicant: Umicore AG & CO. KG, Hanau-Wolfgang (DE)

(72) Inventors: Frank-Walter Schuetze, Haibach (DE); Marcus Pfeifer, Solingen (DE); Michael Schiffer, Hanau (DE); Martin Symalla, Darmstadt (DE); Christoph Hengst, Butzbach (DE)

(73) Assignee: UNICORE AG & CO. KG, Hanau-Wolfgang (DE)

( * ) Notice: Subject to any disclaimer, the term of this patent is extended or adjusted under 35 U.S.C. 154(b) by 5 days.

(21) Appl. No.: 14/407,725

(22) PCT Filed: Jun. 10, 2013

(86) PCT No.: PCT/EP2013/001689
§ 371 (c)(1),
(2) Date: Dec. 12, 2014

(87) PCT Pub. No.: WO2013/185900
PCT Pub. Date: Dec. 19, 2013

(65) Prior Publication Data
US 2015/0139875 A1    May 21, 2015

Related U.S. Application Data

(60) Provisional application No. 61/659,448, filed on Jun. 14, 2012.

(30) Foreign Application Priority Data

Jun. 14, 2012 (EP) ..................... 12171948

(51) Int. Cl.
*B01J 23/42* (2006.01)
*B01J 23/52* (2006.01)
*B01J 33/00* (2006.01)
*B01D 53/94* (2006.01)
*B01J 35/00* (2006.01)
*F01N 3/20* (2006.01)
*B01J 29/072* (2006.01)

(52) U.S. Cl.
CPC ......... *B01D 53/9418* (2013.01); *B01D 53/944* (2013.01); *B01D 53/9477* (2013.01); *B01J 23/42* (2013.01); *B01J 23/52* (2013.01); *B01J 29/072* (2013.01); *B01J 35/0006* (2013.01); *F01N 3/2066* (2013.01); *B01D 2255/106* (2013.01); *B01D 2255/1021* (2013.01); *B01D 2255/1023* (2013.01); *B01D 2255/50* (2013.01); *B01D 2258/012* (2013.01); *F01N 2510/06* (2013.01); *Y02T 10/24* (2013.01)

(58) Field of Classification Search
CPC ........... B01J 33/00; B01D 2255/1021; B01D 2255/1023; B01D 2255/106; B01D 2258/012
See application file for complete search history.

(56) References Cited

U.S. PATENT DOCUMENTS

| | | | |
|---|---|---|---|
| 2,648,393 A * | 8/1953 | Holzmann | B01J 23/96 422/211 |
| 2,730,189 A | 1/1956 | Holzmann | |
| 6,805,849 B1 | 10/2004 | Andreasson et al. | |
| 7,498,010 B2 | 3/2009 | Andreasson et al. | |
| 8,057,768 B2 | 11/2011 | Schneider et al. | |
| 2007/0240402 A1 | 10/2007 | Andreasson et al. | |
| 2010/0221161 A1 | 9/2010 | Schneider et al. | |
| 2011/0138777 A1 | 6/2011 | Jen et al. | |
| 2011/0206584 A1 | 8/2011 | Dobson et al. | |
| 2011/0286903 A1 | 11/2011 | Andreasson et al. | |
| 2013/0095013 A1* | 4/2013 | Banno | B01D 53/9477 423/213.5 |
| 2013/0149221 A1* | 6/2013 | Blakeman | B01J 35/0006 423/213.5 |
| 2013/0149222 A1 | 6/2013 | Blakeman et al. | |
| 2013/0149223 A1 | 6/2013 | Blakeman et al. | |
| 2013/0302214 A1 | 11/2013 | Pfeifer et al. | |
| 2014/0050627 A1* | 2/2014 | Mende | B01D 53/9477 422/171 |
| 2014/0186244 A1* | 7/2014 | Blakeman | B01J 35/0006 423/213.5 |
| 2015/0238934 A1* | 8/2015 | Blakeman | B01J 35/0006 422/171 |

FOREIGN PATENT DOCUMENTS

| | | | | |
|---|---|---|---|---|
| DE | 1 027 880 | | 4/1958 | |
| DE | 102012025751 A1 * | | 7/2015 | ............. F01N 3/103 |
| EP | 1 938 893 A2 | | 7/2008 | |
| FR | 2559787 A * | | 8/1985 | ............. C22B 11/02 |
| GB | 201200781 * | | 2/2012 | ............. F01N 3/103 |
| GB | 2497658 B * | | 5/2015 | ............. F01N 3/103 |

(Continued)

OTHER PUBLICATIONS

Pfeifer et al.; "*The Second Generation of Catalyzed Diesel Particulate Filter Systems for Passenger Cars—Particulate Filters with Integrated Oxidation Catalyst Function*"; SAE Technical Paper Series, 2005-01-1756; (15 pages).
Jen et al.; "*Detection, Origin and Effect of Ultra-Low Platinum Contamination on Diesel-SCR Catalysts*"; SAE Technical Paper, 2008-01-2488; (9 pages).
Cavataio et al. "*Impact and Prevention of Ultra-Low Contamination of Platinum Group Metals on SCR Catalysts Due to DOC Design*"; SAE Technical Paper,09PFL-0503; (13 pages).
International Search Report and English Translation) for PCT/EP/01689 Dec. 19, 2013 (5 pages).
Written Opinion and English Translation for PCT/EP/01689 Dec. 14, 2014 (7 pages).

(Continued)

*Primary Examiner* — Timothy Vanoy
(74) *Attorney, Agent, or Firm* — Smith, Gambrell & Russell, LLP

(57) ABSTRACT

The invention relates to a method for preventing the contamination by platinum of an SCR catalyst in an exhaust-gas treatment system, said system comprising an oxidation catalyst containing platinum on the inflow side of the SCR catalyst. The outflow side of the oxidation catalyst comprises a material zone which removes traces of platinum contained in the exhaust-gas stream.

20 Claims, No Drawings

(56) References Cited

FOREIGN PATENT DOCUMENTS

| JP | 2010/211946 A | 9/2010 | |
|----|---------------|--------|---|
| WO | 99/39809 | 8/1999 | |
| WO | 2008/117941 A1 | 10/2008 | |
| WO | 2009/140989 A1 | 11/2009 | |
| WO | WO 2011162030 A1 * | 12/2011 | ......... B01D 53/9418 |
| WO | 2013/088133 | 6/2013 | |

OTHER PUBLICATIONS

International Preliminary Report on Patentability for PCT/EP/01689 Dec. 16, 2014.

Hung-Wen Jen, et al., "Detection, Origin and Effect of Ultra-Low Platinum Contamination on Diesel-SCR Catalysts", SAE Technical Paper Series, Oct. 6, 2008, SAE 2008-01-2488 (9 pages).

Pfeifer et al., The Second Generation of Catalyzed Diesel Particulate Filter Systems for Passenger Cars—Particulate Filters with Integrated Oxidation Catalyst Function; SAE Technical Paper Series, Apr. 11, 2005, SAE 2005-01-1756 (15 pages).

Giovanni Cavataio, et al., "Impact and Prevention of Ultra-Low Contamination of Platinum Group Metals on SCR Catalysts Due to DOC Design", SAE International, Apr. 20, 2009, SAE 2009-01-627 (13 pages).

U.S. Appl. No. 61/569,530, filed Dec. 12, 2011, Blakeman, et al.
U.S. Appl. No. 61/569,537, filed Dec. 12, 2011, Blakeman, et al.

* cited by examiner

METHOD FOR PREVENTING THE CONTAMINATION BY PLATINUM OF AN SCR CATALYST

The present invention relates to a method for preventing the contamination by platinum of an SCR catalyst in an exhaust gas treatment system by arranging platinum-containing components on the inflow side of the exhaust gas treatment system.

In addition to carbon monoxide (CO) and nitrogen oxides ($NO_x$), the exhaust gas of diesel-powered motor vehicles also contains constituents which originate from incomplete combustion of the fuel in the combustion chamber of the cylinder. These include, in addition to residual hydrocarbons (HC), which are generally likewise present in predominantly gaseous form, particulate emissions known as "diesel particulate matter" or "soot particles".

To purify these exhaust gases, said constituents must be converted as fully as possible into harmless compounds, which is only possible using suitable catalysts.

For instance, carbon monoxide (CO), gaseous hydrocarbons (HC) and any agglomerated organic material bound to the soot particles ("Volatile Organic Fraction", VOF) can be removed oxidatively with the assistance of oxidation catalysts. Oxidation catalysts have long been known in the prior art and are described in the most varied embodiments. In the main, the noble metals platinum and/or palladium are used as oxidation-catalytically active components (see for example US2011/0206584 A1), but gold-containing catalysts have additionally already been described, for example in EP 1 938 893 A2.

To remove particulate emissions from the exhaust gas of diesel vehicles, special particulate filters are used which may be provided with an oxidation-catalytically active coating to improve their properties. Such a coating serves, as described in detail in the document SAE 2005-01-1756, to lower the activation energy for oxygen-based particulate burn-off (soot combustion) and thus to reduce the soot ignition temperature on the filter, to improve passive regeneration behavior through oxidation of nitrogen monoxide contained in the exhaust gas to yield nitrogen dioxide and to suppress hydrocarbon and carbon monoxide emission breakthroughs.

Nitrogen oxides from diesel engine exhaust gases may be converted into harmless nitrogen for example by means of Selective Catalytic Reduction (SCR) using ammonia as reducing agent on a suitable catalyst, the SCR catalyst. The reducing agent must be metered into the exhaust gas line from an on-board additional tank by means of an injection nozzle upstream of the SCR catalyst. However, it is preferably not ammonia itself which is carried but rather a compound which can readily be decomposed into ammonia such as for example urea or ammonium carbamate.

So that the mentioned harmful exhaust components may be removed to the necessary degree, said catalysts or filters must be suitably combined with one another to form an exhaust gas treatment system.

In known exhaust gas treatment systems, described for example in WO99/39809 and WO2009/140989, first of all the oxidation catalyst, then the diesel particulate filter and finally the SCR catalyst are arranged in the direction of flow of the exhaust gas. Furthermore, an injection device for apportioning the reducing agent is also located between diesel particulate filter and SCR catalyst. Depending on requirements, however, solutions without diesel particulate filters may also be considered. In these cases, the exhaust gas treatment system firstly comprises an oxidation catalyst and then the SCR catalyst in the direction of flow of the exhaust gas. The injection device for apportioning the reducing agent is in this case arranged between oxidation catalyst and SCR catalyst.

It is apparent from operation of these systems that the oxidation catalyst, in particular if it has a high platinum content, at elevated temperature and depending on the $\lambda$ value releases traces of platinum into the gaseous phase, which are transported with the exhaust gas stream to the SCR catalyst and contaminate it. Since platinum is highly active with regard to oxidizing ammonia, this results in sufficient ammonia no longer being available for the SCR reaction at temperatures of above approximately 300° C. and nitrogen oxide conversion declining. Moreover, increased formation of dinitrogen monoxide ($N_2O$) is observed, primarily in the temperature range around 250° C. This phenomenon is described for example in the documents SAE 2008-01-2488 and SAE 2009-01-0627.

To solve this problem, US2011/138777 A1 proposes arranging a "platinum group metal trap" in the exhaust gas system downstream of the oxidation catalyst and upstream of the SCR catalyst, said trap containing cerium oxide or a perovskite material as active ingredients.

However, this has the disadvantage that the exhaust gas treatment system requires an additional component, which is difficult to achieve given the limited space in the underbody of a vehicle. Moreover, this solution results in higher costs.

The object of the present invention is accordingly to provide measures which allow traces of platinum released by the oxidation catalyst or other components to be removed and contamination of the SCR catalyst to be prevented without additional components being required or significantly higher costs being incurred. Moreover, operation of the overall exhaust gas treatment system or its individual constituents should as far as possible remain unaffected.

It has now surprisingly been found that this object is achieved if a suitable platinum scavenger is incorporated into the oxidation catalyst.

The present invention accordingly relates to a method for preventing the contamination by platinum of the SCR catalyst in an exhaust gas treatment system, said system comprising an oxidation catalyst containing platinum on the inflow side of the SCR catalyst, characterized in that the oxidation catalyst comprises at the outflow side end thereof a material zone which removes traces of platinum contained in the exhaust gas stream.

For the purposes of the present invention, oxidation catalysts are flow-through substrates which bear oxidation-catalytically active components in the form of one or more coatings. As oxidation-catalytically active constituents they contain platinum, but may in addition also contain one or more other platinum group elements, in particular palladium and/or rhodium or for example gold. The oxidation-catalytically active constituents are supported on the substrate on a high-surface-area, inert supporting material. A particularly preferred oxidation-catalytically active coating contains platinum on aluminum oxide.

The method according to the invention may be used particularly advantageously if the oxidation-catalytically active coating is "platinum-rich", i.e. if it contains as oxidation-catalytically active constituents exclusively platinum or platinum in a mixture with other constituents, wherein platinum is present in excess.

Frequently, mixtures of platinum and palladium are used, wherein the weight ratio of platinum to palladium is 12:1 to 4:1.

The total loading with oxidation-catalytically active metals is preferably 15 to 100 g/ft³ relative to the volume of the oxidation-catalytically active coating.

In addition to the oxidation-catalytically active components, the oxidation catalysts may for the purposes of the present invention also contain components which are capable of chemically bonding nitrogen oxides under lean, i.e. oxygen-rich, exhaust gas conditions and releasing them again under rich, i.e. oxygen-depleted, exhaust gas conditions. Such components are known as nitrogen oxide storage components and are preferably oxides, carbonates or hydroxides of alkali metals, alkaline earth metals and rare earth metals, barium and strontium being particularly preferred.

For the purposes of the present invention, the oxidation catalysts may thus also include an LNT (Lean $NO_x$ Trap) function.

The flow-through substrates may consist of metal and in particular of ceramic materials. They preferably consist of cordierite, silicon carbide, mullite or aluminum titanate. Such substrates are frequently described in the literature and are commercially available.

According to the invention, this oxidation catalyst is then provided with an additional material zone which removes the traces of platinum contained in the exhaust gas stream.

This material zone may in this case be present in various embodiments. In one embodiment of the present invention, said zone is present as an additional layer on the oxidation-catalytically active coating distributed homogeneously over the entire length of the substrate and covers said coating from the end of the oxidation catalyst arranged on the outflow side at least over part of the total length thereof. The material zone which removes the traces of platinum contained in the exhaust gas stream in this case occupies preferably 50% to 100% of the total length of the filter substrate, preferably 50, 60, 70, 80 or 90%.

In a further embodiment, the oxidation-catalytically active coating and the material zone which removes the traces of platinum contained in the exhaust gas stream are arranged in separate zones on the filter substrate. In contrast with the above-described embodiment, the oxidation-catalytically active coating does not here extend over the entire length of the filter substrate.

Thus, if the entire length of the filter substrate is L, the length of the oxidation-catalytically active zone is $L_1$ and the length of the zone which removes the traces of platinum contained in the exhaust gas stream is $L_2$, then $L=L_1+L_2$ applies.

Manufacturing considerations may mean that $L_1+L_2$ does not exactly correspond to L. For instance, $L_1+L_2$ may be somewhat greater than L. This means that the two zones $L_1$ and $L_2$ overlap to a slight extent. On the other hand, $L_1+L_2$ may be somewhat less than L, which means that a small, uncoated gap is located between $L_1$ and $L_2$.

In preferred embodiments of the present invention, the material zone ($L_2$) which removes the traces of platinum contained in the exhaust gas stream occupies 25 to 67% of the total length of the filter substrate. Accordingly, the oxidation-catalytically active zone ($L_1$) occupies 33 to 75% of the total length of the filter substrate.

The material zone which removes the traces of platinum contained in the exhaust gas stream is always arranged on the outflow side, i.e. in the exhaust gas treatment system it points towards the SCR catalyst.

The material zone which removes traces of platinum contained in the exhaust gas stream preferably contains as active component palladium, gold or mixtures thereof, particularly preferably palladium or mixtures of palladium and gold. It is preferably free of further catalytically active constituents. However, said active constituents are preferably present in highly disperse form on typical supporting oxides to increase efficiency as a platinum scavenger. This is described below in greater detail. In the fresh state, i.e. before the oxidation catalyst has been brought into service, the material zone is free of platinum. With an increasing length of service, it goes without saying that the traces of platinum removed from the exhaust gas accumulate. However, experience has shown that these are only present in the ppm range and are therefore not active or only insufficiently active for most catalytic functions.

The quantities of palladium, gold or mixtures thereof to be used depend on the specific requirements of the exhaust gas treatment system under consideration. As a rule, however, the quantities amount to 0.02 to 0.21 g/l (0.5 to 6 g/ft³), preferably 0.04 to 0.11 g/l (1 to 3 g/ft³) (the quantities relate to the substrate volume occupied by the material zone or layer).

If a mixture of palladium and gold is used as the active constituent, the weight ratio of palladium to gold is preferably 0.9-1.1:1 and particularly preferably 1:1.

In a preferred embodiment of the present invention, the proportion by weight of gold amounts to 50% or less (thus for example 10, 20, 30, 40 or 45%) of the total noble metal loading of the oxidation catalyst.

The total loading of the material zone which removes the traces of platinum contained in the exhaust gas stream with palladium, gold or mixtures thereof is preferably 15 to 100 g/ft³, relative to the volume of the stated material zone.

Palladium, gold or mixtures thereof are preferably supported on the substrate on a high-surface-area, inert supporting oxide. Suitable supporting oxides are aluminum oxides, doped aluminum oxides, titanium dioxide, cerium oxide, zirconium oxide, cerium/zirconium mixed oxides, silicon dioxide or mixtures of two or more of the stated oxides. These are known to a person skilled in the art and are commercially available.

In a preferred embodiment of the method according to the invention, the exhaust gas treatment system comprises, in the direction of flow of the exhaust gas, the above-described, platinum-containing oxidation catalyst, a diesel particulate filter and an SCR catalyst.

Wall-flow filter substrates are preferably used as the diesel particulate filter. These are honeycomb bodies with alternately gas-tightly sealed inflow and outflow channels, which are defined by porous walls and separated from one another. The particulate-containing exhaust gas flowing into the inflow channels is forced by a gas-tight sealing stopper located on the outlet side to pass through the porous wall and flows back out of the wall-flow filter substrate from the outflow channels sealed on the inflow side. In the process, diesel particulate matter is filtered out of the exhaust gas.

The honeycomb bodies may consist of metal and in particular of ceramic materials. They preferably consist of cordierite, silicon carbide, mullite or aluminum titanate. Such honeycomb bodies are described on numerous occasions in the literature.

Diesel particulate filters may be provided with an oxidation-catalytically active coating. Such filters are known as cDPFs (catalyzed Diesel Particulate Filters) and described in the literature. As oxidation-catalytically active constituents they generally comprise one or more platinum group elements, in particular platinum, palladium and/or rhodium. These are supported in the form of a coating on the filter substrate on a high-surface-area, inert supporting material. A particularly preferred oxidation-catalytically active coating contains platinum on aluminum oxide.

Conventional products described on numerous occasions and known to a person skilled in the art may also be used as the SCR catalyst. These are conventionally flow-through honeycomb bodies, onto which the catalytically active constituents are applied in the form of a coating.

Suitable SCR catalysts are those based on vanadium oxide or based on vanadium-free mixed oxides, as well as those based on zeolite. Zeolite-based SCR catalysts are preferred, in particular those which are iron- and/or copper-exchanged.

In a further embodiment of the method according to the invention, the exhaust gas treatment system comprises, in the direction of flow of the exhaust gas, the above-described, platinum-containing oxidation catalyst and a diesel particulate filter onto which an SCR catalyst is applied in the form of a coating. Under certain circumstances this system may also comprise a further SCR catalyst on the outflow side of the diesel particulate filter.

Finally, embodiments of the method according to the invention are also conceivable in which the exhaust gas treatment system comprises, in the direction of flow of the exhaust gas, the above-described, platinum-containing oxidation catalyst and an SCR catalyst on the outflow side thereof, i.e. has no diesel particulate filter.

The catalytically active coating is applied to flow-through honeycomb bodies and filter bodies using the conventional dip-coating method or pump and vacuum coating methods with subsequent thermal post-treatment (calcination and optionally reduction with forming gas or hydrogen) which are sufficiently well known from the prior art for these exhaust gas purification units.

The diesel particulate filter according to the invention is highly suitable for providing lasting protection to SCR catalysts from contamination with platinum and thus from loss of activity.

EXAMPLE 1

A conventional, platinum-rich oxidation catalyst with a total length of 101.6 mm, noble metal loading of 40 g/ft$^3$ and a Pt/Pd ratio of 6:1 was coated over a third of its length using a conventional dip-coating method with an additional, palladium- and gold-containing zone. The loading quantity was 40 g/ft$^3$, the ratio of Pd/Au 1:1.

A core drilled from this catalyst was placed on the inflow side of a core drilled from a conventional SCR catalyst containing Fe zeolite, specifically in such a manner that the Pd/Au zone pointed towards the SCR catalyst.

This test exhaust gas treatment system (hereinafter known as C1) was tested as follows and compared with a system in which the oxidation catalyst did not have an additional Pd/Au zone but was otherwise identical (hereinafter known as CC1).

Both systems were firstly aged at a temperature of 720° C. on the inflow side of the oxidation catalyst (corresponds to 700° C. on the outflow side of the oxidation catalyst) for 12.5 hours with a gas consisting of 10% oxygen and 90% nitrogen.

The $NO_x$ conversion rate of the SCR catalyst was then determined in a model gas installation, together with $N_2O$ formation at 500° C., 250° C. and 200° C.

The following model gas was used:

| | |
|---|---|
| NO | 500 ppm |
| $NO_2$ | — |
| $NH_3$ | 450 ppm (alpha = 0.9) |
| $O_2$ | 5% |
| $H_2O$ | 5% |
| $N_2$ | remainder |

The SCR catalyst of the comparison system CC1 displayed marked platinum contamination, indicated by a decrease in the $NO_x$ conversion rate at 500° C. and increased $N_2O$ formation at 250° C.

In contrast, the SCR catalyst of system C1 did not display these effects. Both the $NO_x$ conversion rate and $N_2O$ formation remained at the same level as that of a fresh SCR catalyst. There is thus no indication of contamination of the SCR catalyst by platinum in system C1.

It is thus clear that the additional Pd/Au zone on the oxidation catalyst effectively protects the SCR catalyst on the outflow side from platinum contamination.

The invention claimed is:

1. A method for preventing the contamination by platinum of an SCR catalyst in an exhaust gas treatment system, comprising:
    passing an exhaust gas stream through the exhaust gas treatment system, the exhaust gas treatment system comprising an oxidation catalyst substrate positioned upstream of the SCR catalyst, wherein
    the oxidation catalyst substrate comprises an oxidation-catalytically active coating containing platinum, and
    the oxidation catalyst substrate further comprises, on an outflow side of the substrate, a material zone that removes traces of platinum contained in the exhaust gas stream.

2. The method as claimed in claim 1, wherein
    the material zone that removes traces of platinum contained in the exhaust gas stream extends over a length of the oxidation catalyst substrate such that the material zone covers, at least in part, the oxidation-catalytically active coating of the oxidation catalyst substrate.

3. The method as claimed in claim 2, wherein the material zone that removes the traces of platinum contained in the exhaust gas stream occupies 50 to 100% of the total length of the oxidation catalyst substrate.

4. The method as claimed in claim 1, wherein the oxidation-catalytically active coating and the material zone that removes the traces of platinum contained in the exhaust gas stream are present in separate zones on the oxidation catalyst substrate.

5. The method as claimed in claim 4, wherein the material zone that removes the traces of platinum contained in the exhaust gas stream occupies 25 to 67% of the total length of the oxidation catalyst substrate.

6. The method as claimed in claim 1, wherein the material zone that removes traces of platinum contained in the exhaust gas stream contains, as an active component, palladium, gold, or mixtures thereof.

7. The method as claimed in claim 6, wherein the palladium, gold, or mixtures thereof are present in quantities of 0.02 to 0.21 g/l (0.5 to 6 g/ft$^3$) relative to the volume occupied by the material zone.

8. The method as claimed in claim 6, wherein the palladium, gold, or mixtures thereof are present in quantities of 0.04 to 0.11 g/l (1 to 3 g/ft$^3$) relative to the volume occupied by the material zone.

9. The method as claimed in claim 6, wherein the palladium, gold, or mixtures thereof are supported on a high-surface-area, inert supporting oxide.

10. The method as claimed in claim 9, wherein the supporting oxide is aluminum oxide, doped aluminum oxides, titanium dioxide, cerium oxide, zirconium oxide, cerium/'zirconium mixed oxide, silicon dioxide, or a mixture of two or more of the stated oxides.

11. A method for preventing the contamination by platinum of an SCR catalyst in an exhaust gas treatment system, comprising:
   passing an exhaust gas stream through the exhaust gas treatment system, the exhaust gas treatment system comprising an oxidation catalyst substrate positioned upstream of the SCR catalyst, wherein
   the oxidation catalyst substrate comprises an oxidation-catalytically active coating, and
   the oxidation catalyst substrate further comprises, on an outflow side of the substrate, a material zone that removes traces of platinum contained in the exhaust gas stream.

12. The method as claimed in claim 11, wherein
   the material zone that removes traces of platinum contained in the exhaust gas stream extends over a length of the oxidation catalyst substrate such that the material zone covers, at least in part, the oxidation-catalytically active coating of the oxidation catalyst substrate.

13. The method as claimed in claim 12, wherein the material zone that removes the traces of platinum contained in the exhaust gas stream occupies 50 to 100% of the total length of the oxidation catalyst substrate.

14. The method as claimed in claim 11, wherein the oxidation-catalytically active coating and the material zone that removes the traces of platinum contained in the exhaust gas stream are present in separate zones on the oxidation catalyst substrate.

15. The method as claimed in claim 14, wherein the material zone that removes the traces of platinum contained in the exhaust gas stream occupies 25 to 67% of the total length of the oxidation catalyst substrate.

16. The method as claimed in claim 11, wherein the material zone that removes traces of platinum contained in the exhaust gas stream contains, as an active component, palladium, gold, or mixtures thereof.

17. The method as claimed in claim 16, wherein the palladium, gold, or mixtures thereof are present in quantities of 0.02 to 0.21 g/l (0.5 to 6 g/ft$^3$) relative to the volume occupied by the material zone.

18. The method as claimed in claim 16, wherein the palladium, gold, or mixtures thereof are present in quantities of 0.04 to 0.11 g/l (1 to 3 g/ft$^3$) relative to the volume occupied by the material zone.

19. The method as claimed in claim 16, wherein the palladium, gold, or mixtures thereof are supported on a high-surface-area, inert supporting oxide.

20. The method as claimed in claim 19, wherein the supporting oxide is aluminum oxide, doped aluminum oxides, titanium dioxide, cerium oxide, zirconium oxide, cerium/'zirconium mixed oxide, silicon dioxide, or a mixture of two or more of the stated oxides.

* * * * *